United States Patent
Goolsby

[15] 3,659,943
[45] May 2, 1972

[54] FLOATING LIQUID MONITOR

[72] Inventor: Alvin D. Goolsby, Moraga, Calif.
[73] Assignee: Shell Oil Company, New York, N.Y.
[22] Filed: Jan. 15, 1970
[21] Appl. No.: 3,161

[52] U.S. Cl............................356/70, 250/218, 356/72, 356/103, 356/104, 356/208, 356/209, 356/212
[51] Int. Cl..............G01n 33/28, G01n 21/48, G01n 21/06
[58] Field of Search.................356/70, 72, 102–104, 356/208–212; 250/218

[56] References Cited

UNITED STATES PATENTS

| | | | |
|---|---|---|---|
| 2,060,957 | 11/1936 | Tarvin et al. | 356/209 X |
| 2,401,929 | 6/1946 | Hammond, Jr. | 250/218 X |
| 2,852,693 | 9/1958 | Hughes et al. | 356/70 X |
| 3,065,665 | 11/1962 | Akhtar et al. | 356/103 X |
| 3,278,753 | 10/1966 | Pitts et al. | 250/218 |
| 3,309,956 | 3/1967 | Hach | 356/103 |
| 3,417,251 | 12/1968 | Leonard et al. | 356/103 X |
| 3,490,849 | 1/1970 | Hambleton | 356/212 X |
| 3,528,750 | 9/1970 | Hach | 250/218 X |
| 2,406,166 | 8/1946 | Scott | 356/212 |
| 2,546,450 | 3/1951 | Hunter | 356/212 |
| 3,549,261 | 12/1970 | Hach | 356/195 |

FOREIGN PATENTS OR APPLICATIONS 251,919   1/1967   Austria.........................356/104

Primary Examiner—Ronald L. Wibert
Assistant Examiner—Warren A. Sklar
Attorney—T. E. Bieber and J. H. McCarthy

[57] ABSTRACT

Apparatus for detecting the presence of a reflective liquid of lesser density floating on a more dense liquid of different reflectivity wherein the intensity of a beam of reflected light is measured to detect the presence of less dense liquid.

11 Claims, 3 Drawing Figures

Patented May 2, 1972 3,659,943

INVENTOR:
A. D. GOOLSBY
BY:
A. H. McCarthy
HIS ATTORNEY

INVENTOR:
A. D. GOOLSBY
BY:
*J. H. McCarthy*
HIS ATTORNEY

FLOATING LIQUID MONITOR

BACKGROUND OF THE INVENTION

1. Field of the Invention

This invention relates to an instrument for monitoring the surface of liquids to detect the presence of less dense floating liquids.

SUMMARY OF THE INVENTION

The object of this invention is to detect the presence of a reflective liquid of lesser density floating on a more dense liquid of different reflectivity, for example, to detect the presence of oil on water. This objective is achieved by measuring and recording the intensity of a beam of light reflected from the surface of the liquid to be tested. An appropriate increase or decrease in the intensity of the reflected beam is indicative of the presence of the floating liquid.

DESCRIPTION OF THE PREFERRED EMBODIMENTS

Figure 1:
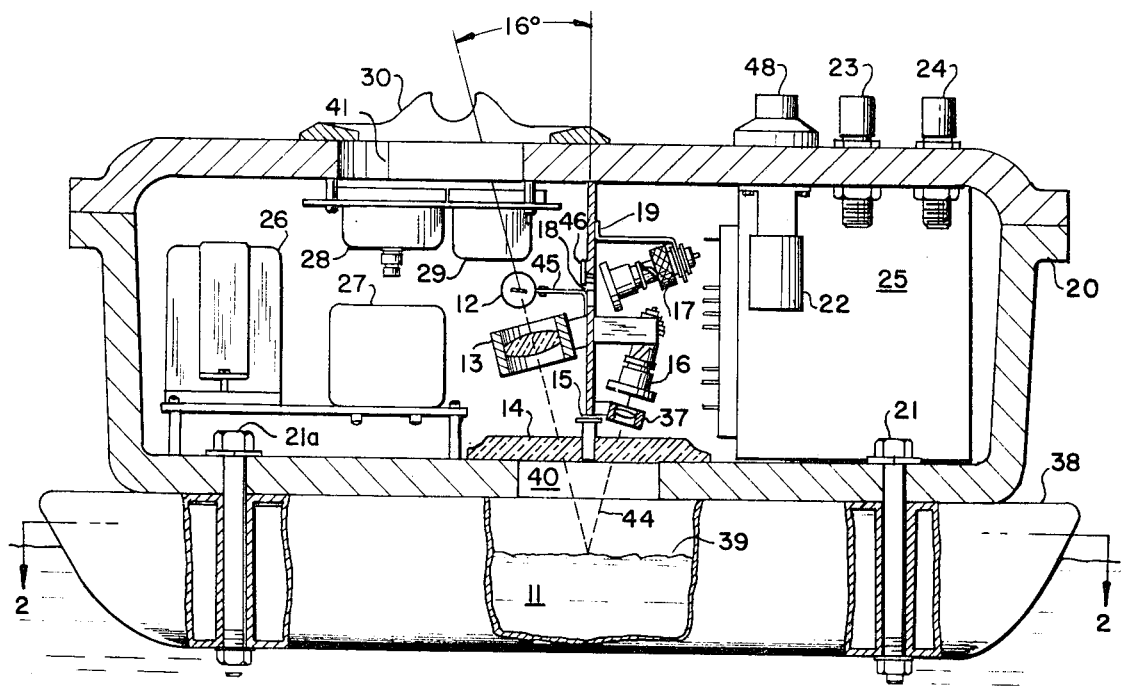
FIG. 1 is a diagrammatic perspective view of the side of a preferred embodiment of the invention.
Figure 2:
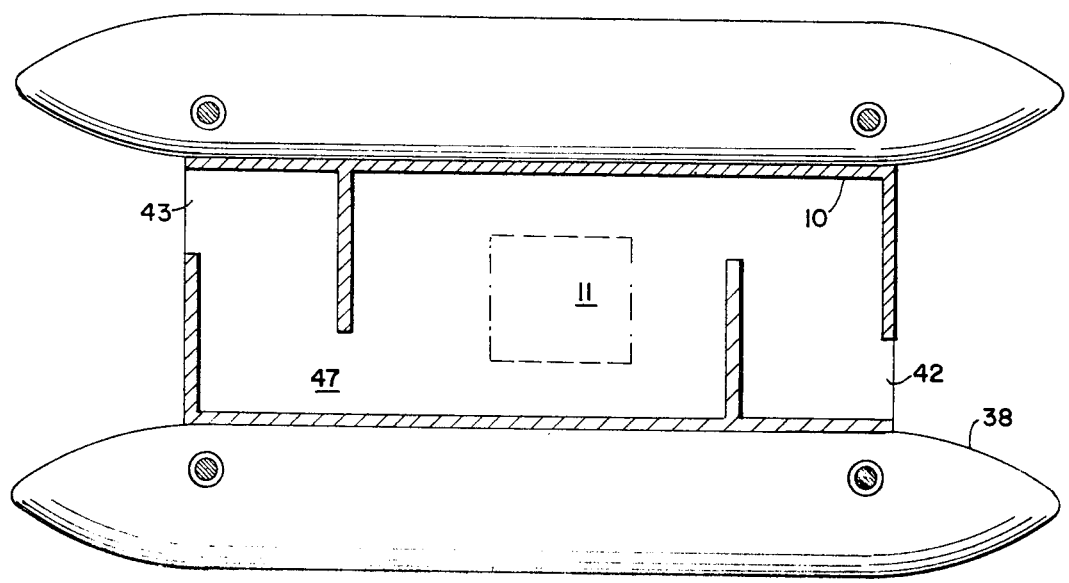
FIG. 2 is a horizontal section of the preferred embodiment of FIG. 1 taken on line 22.
Figure 3:
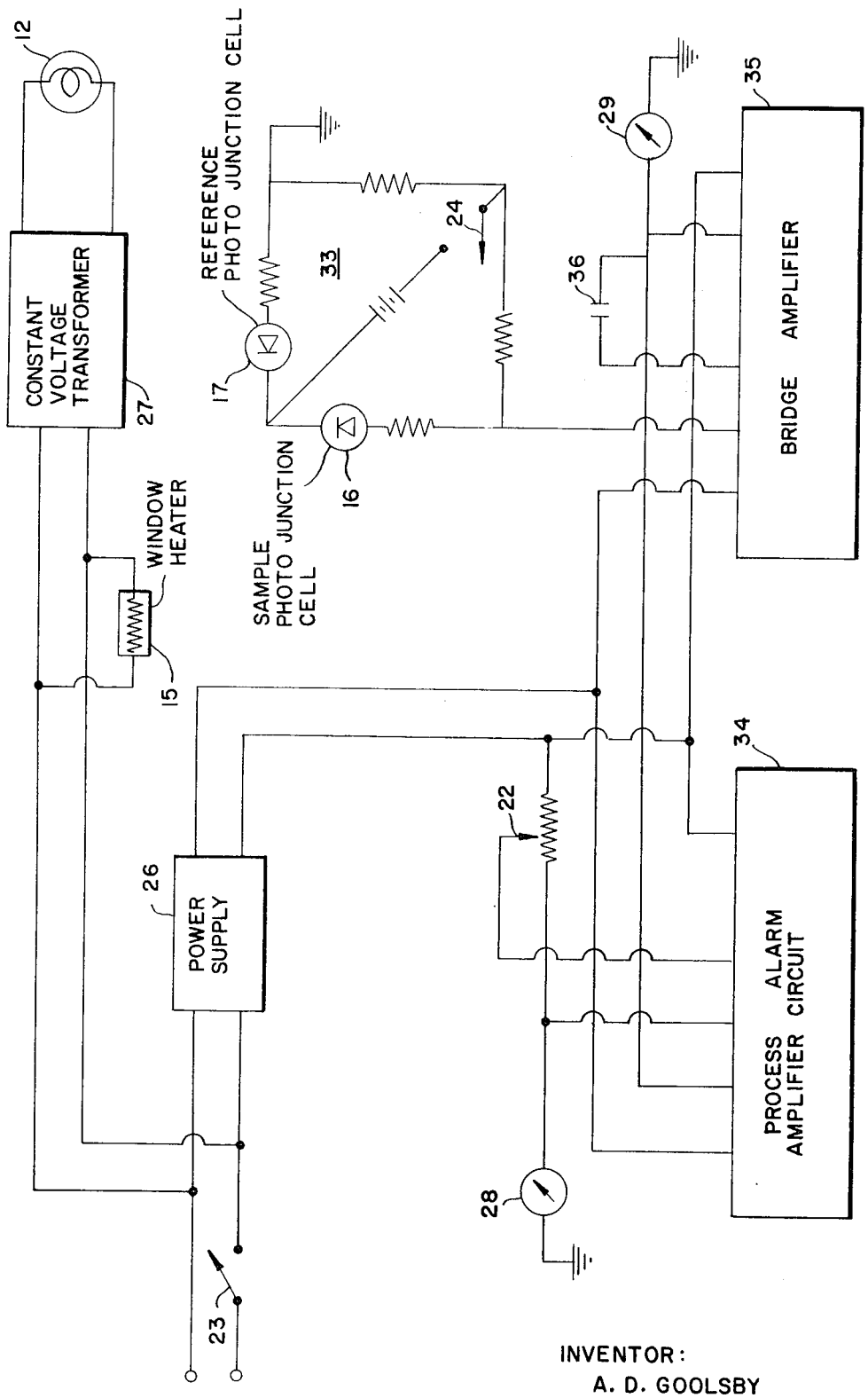
FIG. 3 is a circuit diagram of the preferred embodiment of FIG. 1.

Referring to FIGS. 1, 2 and 3, the electrical components of a preferred embodiment of the invention are enclosed in explosion-proof housing 20 which is provided with apertures 40 and 41 and adapted to be mounted above a turbulence reducing baffle means 10. The baffle means 10 at least a portion of which extends beneath the surface 39 of the liquid to be tested may be provided with ports 42 and 43 through which liquid may pass into and out of a fluid channel 47. This baffle means 10 may be operatively connected to the housing 20 by connecting means, such as bolts 21 and 21a. The housing 20 may also be affixed to a buoyant substructure 38. A light source 12, which may be in incandescent lamp preferably powered by a constant voltage transformer 27, is affixed by support means 45 to a partition 19 which separates it from a reference light-sensitive pickup means such as photojunction cell 17. The partition 19 is provided with an aperture 18 and preferably carries an adjustable aperture means such as flap 46. The reference pickup 17 is positioned to receive light passing from the light source 12 through the aperture 18. A converging lens 13 is positioned between the light source 12 and the water surface 39 to cause approximately parallel rays of light to strike the surface 39 39 preferably at an angle of incidence of 0° to 20° (16° in FIG. 1). A light path window 14 which covers aperture 40 may be recessed and heated by a window heater 15 to reduce condensation where present. A sample light-sensitive pickup means such as photojunction cell 16 is oriented to receive light reflected from the liquid surface 39 at an angle equal to the angle of incidence. A converging lens 37 may be interposed between the sample pickup 16 and the liquid surface 39 to focus reflected light on the sample pickup 16.

The sample and reference pickups, 16 and 17 are disposed in adjacent legs of a bridge circuit 33 which may be activated by switch means 24. Bridge circuit 33 is coupled to a variable gain amplifier circuit 35, the output of which may be filtered to remove small scale signals due to surface turbulence by filter means as, for example, a capacitor filter 36 or a peak picking circuit. The bridge amplifier 35 is in turn coupled to a recording device such as signal meter 29 and to a process alarm amplifier circuit 34 which may be an alarm circuit that provides an output only if the input into the circuit exceeds a preselected magnitude. This threshold magnitude may be regulated by means such as level adjust potentiometer 22 which is controlled by a level set control knob 48. An alarm display means such as an alarm meter 28 or a light or horn may be coupled to the process alarm circuit 34 to indicate the output thereof. The bridge amplifier 35 and process alarm circuit 34 may be powered by means such as power supply 26 which rectifies a.c. current and may be carried by a circuit card 25. The apparatus may be turned on or off by switch means 23. Meter viewing window 30 over housing aperture 41 provides visual access to alarm meter 28 and signal meter 29.

The apparatus of this invention provides means to detect the presence of reflective liquids of lesser density floating on a more dense liquid of different reflectivity, for example, to detect the presence of oil, a more reflective fluid of lesser density, floating on water, a less reflective fluid of greater density, in refinery effluent systems or in dock areas where oil spillage is a problem.

To prepare the apparatus for operation it should be placed in the liquid to be tested with switch means 23 and 24 turned to the "on" position. The bridge circuit 33 is then preferably balanced with only liquid of greater density passing through the baffle means. Balance is achieved by regulating the adjustable aperture means 18 until equal amounts of light strike the reference and sample pickups 17 and 16. This status is indicated by a null reading on the signal meter 39.

In operation, liquid enters the fluid channel 47 in baffle means 10 through port 42, passes through a region of light reflection 11, then passes out of the device through another port 43. As the liquid passes through the region of light reflection 11, light from the light source 12 passes through the converging lens 13 and the light path window 14 to strike the surface 39 of the liquid to be tested. A portion of this light is reflected from the surface 39 along a light path 44 passing through light path window 14 and converging lens 37 to be focused on the face of sample pickup 16. As long as the reflected light striking sample pickup 16 and the light passing from light source 12 through the adjustable aperture 18 to strike reference pickup 17 are of equal intensity, bridge circuit 33 remains balanced. However, if a floating film of oil or other liquid of reflectivity different from the reflectivity of the liquid of greater density passes through the apparatus, the intensity of reflected light striking the sample light sensitive pickup means changes causing bridge circuit 33 to become unbalanced and transmit a signal to bridge amplifier 35. This signal is filtered by capacitor filter 36, registered on signal meter 29, and may, if desired, be arranged to pass to the process alarm amplifier circuit 34. If the signal exceeds the threshold magnitude of process alarm circuit 34, this circuit element amplifies the signal so as to actuate alarm meter 28 giving an observer notice of the presence of the floating liquid. The threshold magnitude of process alarm circuit 30 may be adjusted by regulating level adjust potentiometer 22 so that the circuit is activated by signals of varying magnitude depending upon the difference in reflectivity to be expected between the less dense floating liquid and the liquid of greater density.

The embodiment of FIG. 1 may be affixed to and supported by a buoyant substructure 38 which maintains light source 12 and sample pickup 16 at constant elevations above liquid surface 39 to prevent movement of the reflected beam 44 away from the face of the sample pickup as the level of the liquid to be tested changes. It is understood that where the level of the liquid to be tested does not vary the apparatus may be fixedly supported above the surface of the liquid to be tested by other appropriate means and that other level compensating support means may be used where liquid level does vary. It is also understood that while the embodiment of FIG. 1 may be operatively attached to a turbulence-reducing baffle means said baffle means, may, where needed, alternatively, be fixedly mounted below the apparatus in a channel or container which carries the liquid to be tested.

In summary, this invention provides apparatus for detecting the presence of a reflective liquid of lesser density floating on a more dense liquid of different reflectivity, comprising a light source 12, sample light-sensitive pickup means 16 oriented to receive light from the source that has been reflected from the surface of the liquid to be tested, display means 28 for indicating the presence of a floating film of differing reflectivity on the surface of the liquid to be tested, and circuit means interconnecting the light-sensitive pickup means with the display means. The circuit means may comprise an alarm amplifier circuit 34 coupled to the sample pickup means, said alarm circuit being disposed to provide an output only if the input into the circuit varies from a preselected magnitude.

In the one embodiment of the invention a reference light-sensitive pickup means 17 may be positioned to received light directly from the light source. This reference light-sensitive means and the sample light-sensitive pickup means may be operatively connected to the alarm amplifier circuit via a bridge circuit 33, said light-sensitive pickup means being disposed in adjacent legs of the bridge circuit.

The performance of the apparatus may be improved if a converging lens 13 is interposed between the light source and the surface of the liquid to be tested to cause approximately parallel rays of light to strike the surface. The performance may be further improved if a converging lens 37 is interposed between the sample light-sensitive pickup means and the surface of the liquid to be tested.

Where necessary, the apparatus may be affixed to and supported by a buoyant substructure or float 38. If the invention is to be used where the surface of the liquid to be tested is not smooth, a turbulence-reducing baffle means 10, at least a portion of which extends beneath the surface of the liquid to be tested, may be operatively connected to the apparatus.

I claim as my invention:

1. Apparatus for monitoring a liquid surface of changing level to detect the presence of a first reflective liquid floating on a second reflective liquid of different reflectivity comprising:
   a light source oriented to project light onto a liquid surface to be tested at a selected angle of incidence;
   sample light-sensitive pickup means for measuring the intensity of light reflected from the liquid surface oriented to receive light from the source that has been reflected from the liquid surface at angle of reflection equal to the selected angle of incidence, whereby said sample light-sensitive pickup means measures a first intensity indicative of the first reflective liquid when first reflective liquid is present on the liquid surface tested and a second, different, intensity indicative of the second reflective liquid when second reflective liquid is present on the liquid surface tested;
   display means responsive to the light intensity measured by the sample light-sensitive pickup means for generating a signal indicating the presence of the floating first reflective liquid when the sample light-sensitive pickup means measures an intensity equal to said first intensity;
   circuit means interconnecting the sample light-sensitive pickup means with the display means; whereby when the sample light-sensitive pickup means measures a reflected light intensity equal to said first intensity, the display means generates a signal indicating the presence of the first reflective liquid; and
   a buoyant substructure operatively connected to the light source and sample light-sensitive pickup means for supporting the light source and sample light-sensitive pickup means at a substantially constant elevation above the surface of the liquid to be tested, whereby the sample light sensitive pickup means continues to receive light from the source reflected from the liquid surface at the selected angle of incidence as the level of that surface changes.

2. The apparatus of claim 1 wherein the circuit means comprises an alarm amplifier circuit coupled to the sample light-sensitive pickup means, said alarm circuit including means to provide an output only if the input into the alarm circuit from the sample light-sensitive pickup means varies from a preselected magnitude substantially equal to the input into the alarm circuit when said sample light-sensitive pickup means is measuring an intensity equal to said second intensity to a magnitude substantially equal to the input into the alarm circuit when said sample light-sensitive pickup means is measuring an intensity equal to said first intensity.

3. The apparatus of claim 1 including reference light-sensitive pickup means for measuring a reference light intensity and positioned to receive light directly from the light source;
   means for adjusting the intensity of light from the light source striking the reference light-sensitive pickup means to change the reference light intensity; and
   operatively associated with the display means, means for comparing light intensity measured by the sample light-sensitive pickup means with the reference light intensity measured by the reference light-sensitive pickup means to detect changes in the amount of light reflected from the liquid surface to be tested and thereby detect the presence of the floating first reflective liquid.

4. The apparatus of claim 3 wherein the means for comparing light intensity measured by the sample light-sensitive pickup means with the reference light intensity measured by the reference light-sensitive pickup means comprises:
   a bridge circuit; said light-sensitive pickup means being connected in adjacent legs of the bridge circuit, whereby the balance of the bridge circuit is changed when the intensity of light striking the sample light-sensitive pickup means changes with respect to the intensity of the light striking the reference light-sensitive pickup means.

5. The apparatus of claim 1 further comprising a converging lens interposed between the light source and the surface of the liquid to be tested to cause approximately parallel rays of light to strike the surface.

6. The apparatus of claim 3 further comprising a converging lens interposed between the sample light-sensitive pickup means and the surface of the liquid to be tested.

7. The apparatus of claim 1 further comprising a turbulence reducing baffle means at least a portion of which extends beneath the surface of the liquid to be tested operatively connected to the apparatus.

8. The apparatus of claim 3 wherein the means for adjusting the intensity of light from the light source striking the reference light-sensitive pickup means comprises:
   an opaque partition having an aperture therein positioned between the reference light-sensitive pickup means and the light source; and
   adjustable aperture means associated with the aperture for adjusting the amount of light passing from the light source through the aperture to the reference light-sensitive pickup means.

9. Apparatus for detecting the presence of a film of oil on a water surface of changing level comprising:
   an enclosed explosion-proof housing having at least one aperture in the bottom portion thereof positioned above the water surface;
   a window covering the aperture;
   a light source disposed in the housing to project light out of the housing through the window onto a liquid surface to be tested at a selected angle of incidence;
   a sample light-sensitive pickup means for measuring the intensity of light reflected from the liquid surface disposed in the housing to receive light from the source reflected from the liquid surface at an angle of reflection equal to the selected angle of incidence, said sample light sensitive pickup means measuring a relatively high intensity when a film of oil is present on the liquid surface and a relatively low intensity when no film of oil is present on the liquid surface;
   display means responsive to the sample light-sensitive pickup means for indicating the presence of a floating film of oil on the water surface when the measured intensity of the reflected light received by the sample light-sensitive pickup means exceeds a pre-selected value;
   circuit means interconnecting the sample light-sensitive pickup means with the display means; said circuit means including means for generating a signal indicative of the presence of an oil film when the light-sensitive pickup means measures a light intensity higher than the preselected value; and a buoyant substructure affixed to the enclosed explosion proof housing for supporting the housing and enclosed light-source and sample light-sensitive pickup means at a substantially constant elevation above the surface of the liquid to be tested, whereby the sample light-sensitive pickup means continues to receive light from the source reflected from the liquid surface to be measured as the level of that surface changes.

10. The apparatus of claim 9 including:

reference light-sensitive pickup means disposed in the housing to receive light directly from the light source;

light intensity adjusting means positioned in the housing between the light source and the reference light-sensitive pickup means for adjusting the intensity of light striking the reference light-sensitive pickup means to a selected reference intensity; and wherein the means for generating a signal indicative of the presence of an oil film comprises a bridge circuit operatively connecting the reference light-sensitive pickup means and the sample light-sensitive pickup means to the display means, the respective light-sensitive pickup means being disposed in adjacent legs of the bridge circuit whereby the balance of the bridge circuit is changed when the intensity of the light striking the sample light-sensitive pickup means changes with respect to the reference intensity of light striking the reference light-sensitive pickup means.

11. The apparatus of claim 10 wherein the light intensity adjusting means comprises:

an opaque partition having an aperture therein; and aperture adjusting means associated with the aperture for adjusting the amount of light passing from the light source through the aperture to the reference light-sensitive pickup means.

* * * * *